United States Patent Office 3,445,567
Patented May 20, 1969

3,445,567
STABLE STANNOUS FLUORIDE COMPOSITION
Joseph C. Muhler, Indianapolis, Ind., assignor to Indiana University Foundation, Bloomington, Ind., a not-for-profit corporation of Indiana
No Drawing. Filed Feb. 10, 1966, Ser. No. 526,371
Int. Cl. A61k 27/00, 7/16
U.S. Cl. 424—52                                           4 Claims

ABSTRACT OF THE DISCLOSURE

Stable anticariogenic compositions effective in increasing the caries resistance of tooth tissues, especially the walls of a tooth cavity prior to restorative filling, may be obtained by admixing with an aqueous stannous fluoride solution comprising up to about 30% by weight stannous fluoride, a stabilizing agent selected from the group consisting of sorbitol and mixtures of sorbital and glycerine comprising at least about 25% sorbitol, by volume, with the volumetric ratio of stabilizing agent to water being about 1:1.

---

The present invention generally relates to stable stannous fluoride compositions and more particularly relates to a stable stannous fluoride composition suitable for use in treating the teeth, especially tooth cavities, in order to reduce the solubility of enamel and dentin.

The ability of stannous and fluoride ions supplied by an aqueous stannous fluoride ($SnF_2$) solution to reduce the enamel solubility of the teeth has long been known. However, one of the difficulties experienced with aqueous stannous fluoride solutions is the relative instability thereof due to the hydrolytic and oxidative loss of stannous ions. Thus, a primary object of the present invention is to provide a stable stannous fluoride composition, that is, a composition in which the tendency of the stannous ion to be oxidized or hydrolized is inhibited. Another object is to provide a novel method for stabilizing an aqueous stannous fluoride solution.

The stable stannous fluoride composition of the present invention has been shown to have substantial utility when used in the treatment of tooth cavities. In particular, it has been shown that, when the stable stannous fluoride solution of the present invention is employed to treat the walls of a freshly cut tooth cavity prior to the application of restorative material, greater tin and fluoride ion uptake in the cavity walls is experienced than if an aqueous $SnF_2$ solution is used. Thus, a related object of the present invention is to provide a stable stannous fluoride solution suitable for use in the treatment of freshly cut tooth cavities.

It is generally accepted by those skilled in the art that a direct relationship exists between reductions in enamel solubility of teeth treated with $SnF_2$ and the anticariogenic properties thereof, that is, teeth treated with $SnF_2$ exhibit a greater resistance to the formation of dental caries. When the walls of a freshly cut tooth cavity are treated with the stable stannous fluoride solution of the present invention, improved stannous and fluoride ion uptake are experienced, and the treated tissue is thereby rendered more resistant to dental caries. The treatment of walls of freshly cut tooth cavities is particularly desirable in this connection in order that the formation of further dental caries in the tooth (from which decayed material has been removed) be inhibited to the greatest possible extent. Accordingly, a still further object of the present invention is to provide a method for treating freshly cut tooth cavities in order to inhibit the reformation and spread of dental caries in the tissues of the tooth.

Occasionally, use of aqueous stannous fluoride solution to treat tooth tissues has been accomplished by undesirable localized soft tissue reaction. Thus, yet another object of the present invention is to provide a stable stannous fluoride solution that may be employed without any adverse soft tissue reaction.

These and other objects, advantages, and features of the present invention will hereinafter appear from the following detailed description of the invention, including exemplary embodiments thereof.

In accordance with the present invention, it has been found that a stable anticariogenic stannous fluoride composition may be obtained by admixing a stabilizing agent selected from the group consisting of sorbitol and mixtures of glycerine and sorbitol with an aqueous solution containing up to about 30% stannous fluoride by weight of the composition. Where mixtures of sorbital and glycerine are employed, such mixtures comprise at least about 25% sorbitol. Stability of the stable stannous fluoride composition is maximized when oxygen-free redistilled water is employed in the preparation thereof.

An exemplary stable stannous fluoride composition may be prepared in accordance with the following example.

Example I

About 300 grams of C.P. grade $SnF_2$ were dissolved with stirring in oxygen-free redistilled water and diluted to a total volume of 500 milliliters. Gentle heating at about 60° C. was required in order to effect complete solution. The mixture was then gravity filtered into a mixture of 250 milliliters glycerine (U.S.P.) and about 250 milliliters of sorbitol, and the resultant mixture stirred thoroughly. A clear stable stannous fluoride solution was obtained that could be stored indefinitely in a polyethylene container.

The solution contained about 30% stannous fluoride (the maximum $SnF_2$ solubility). However, should solutions containing smaller amounts of $SnF_2$ be desired (e.g., 10% or 20% stannous fluoride solutions), such compositions may be produced by utilizing smaller amounts of stannous fluoride.

The same method of preparation may be used when sorbitol alone or other mixtures of sorbitol and glycerine are employed as stabilizing agents, that is, the aqueous $SnF_2$ solution is first prepared and then mixed with a substantially equal volume of the stabilizing agent desired.

A preferred composition produced in accordance with the present invention comprises about 30% by weight of stannous fluoride dissolved in a 1:1 volume mixture of oxygen-free redistilled water and of a stabilizing agent comprising a 1:1 volume mixture of glycerine and sorbitol. As noted, other suitable stabilizing agents include sorbitol alone and mixtures of glycerine and sorbitol containing at least about 25% sorbitol.

The stability of the preferred stable stannous fluoride composition of the present invention is demonstrated by the following example.

Example II

Stannous ion and fluoride ion availabilities were measured for a 30% stannous fluoride solution prepared in accordance with the procedure set forth in Example I, wherein the stabilizing agent employed comprises a 1:1 volume mixture of glycerine and sorbitol admixed with water at a 1:1 stabilizing agent to water volume ratio. Measurements were made in accordance with conventional techniques well known to those skilled in the art. Analytical data (both theoretical and actual) are given in the following table for a freshly prepared stable stannous fluoride solution and for the same solution aged 18 weeks at room temperature in order to demonstrate the stability thereof.

TABLE I

| | Theoretical values | Fresh Solution | Solution after 18 weeks |
|---|---|---|---|
| Percent stannous fluoride ($SnF_2$) | 30.00 | 31.32 | 31.27 |
| Percent fluoride ion ($F^-$) | 7.28 | 8.03 | 7.93 |
| Percent stannous ion ($Sn^{++}$) | 22.72 | 23.29 | 23.34 |
| pH | 1.7 | 1.6 | 1.6 |

The data of Table I fully substantiate the stable quality of the preferred stable stannous fluoride composition of the present invention.

The effectiveness of the stabilizing agents of the present invention relative to other evaluated agents in stabilizing aqueous stannous fluoride solutions is demonstrated in Example III.

Example III

Various aqueous stannous fluoride solutions were prepared in accordance with the method of Example I using various agents including the stabilizing agents of the present invention at a 1:1 volume ratio of stabilizing agent to water. Initial and two weeks data for percent stannous fluoride, percent fluoride ion, and percent stannous ion were obtained as in Example II and are reported in Table II. As noted in Table II, at the end of the two week period, a precipitate had formed in all of the solutions except the compositions forming the subject of the present invention (that is, stannous fluoride solutions stabilized with a member selected from the group consisting of sorbitol and mixtures of glycerine and sorbitol) and a 1:1 mannitol:water composition.

TABLE II.—VARIOUS STABILIZING AGENTS

| | Initial data, percent— | | | Two week data, percent— | | |
|---|---|---|---|---|---|---|
| Stabilizing agent (ratio) | $Sn^{++}$ | $F^-$ | $SnF_2$ | $Sn^{++}$ | $F^-$ | $SnF_2$ |
| Glycerine | 20.63 | 6.69 | 27.32 | 16.76 | 5.61 | *22.37 |
| Propylene glycol | 9.77 | 6.86 | 16.63 | 9.68 | 3.90 | *13.58 |
| Sorbitol | 19.97 | 6.61 | 26.58 | 19.39 | 6.32 | 25.71 |
| Sorbitol: glycerine (3:1) | 20.66 | 6.68 | 27.34 | 20.66 | 7.20 | 27.86 |
| Sorbitol: glycerine (1:3) | 20.49 | 7.05 | 27.54 | 21.04 | 7.26 | 28.30 |
| Ethanol | 7.02 | 2.93 | 9.95 | 6.68 | 2.87 | *9.55 |
| Do | 19.71 | 9.81 | 29.52 | 18.23 | 7.29 | *25.52 |
| Mannitol | 24.01 | 8.23 | 32.24 | 23.02 | 8.23 | 31.25 |
| Mannitol: glycerine (1:1) | 19.54 | 7.08 | 26.62 | 17.49 | 6.13 | *23.62 |
| Glycerine: sorbitol (1:1) | 23.29 | 8.03 | 31.32 | 23.13 | 8.03 | 31.16 |

*Precipitate formed.

Although the data of Table II suggest that a 1:1 mannitol:water solution provides a stable stannous fluoride solution, after about four months a precipitate had formed in the mannitol:water system so that the solution prepared with mannitol cannot be considered to be truly stable. The other effective stabilizing agents (i.e., 1:3 glycerine:sorbitol; 3:1 glycerine:sorbitol; 1:1 glycerine:sorbitol; and sorbitol alone) all remained clear at the end of four months. The data of Table II thus verifies the effectiveness of the stabilizing agents of the present invention relative to the other agents evaluated.

A previously noted, where mixtures of glycerine and sorbitol are employed, at least about 25% by volume of sorbitol must be provided. If sorbitol is provided at less than the 25% level, the resulting composition will be unstable, as shown in the following example.

Example IV

Twenty-four hour stannous ion availability determinations were made for 30% by weight stannous fluoride solutions prepared with various glycerine-sorbitol mixtures. These data are reported in Table III. The data of Table III verify that mixtures containing at least about 25% sorbitol were effective, but mixtures containing about 20% sorbitol or less were ineffective. Moreover, as noted in Table II, glycerine alone is ineffective.

TABLE III

Various stabilizing agents

| Stabilizing agent (ratio): | 24 hour data, percent $Sn^{++}$ |
|---|---|
| Theoretical | 22.72 |
| Sorbitol:glycerine (3:1) | 23.79 |
| Sorbitol:glycerine (1:1) | 23.29 |
| Sorbitol:glycerine (1:3) | 23.59 |
| Sorbitol:glycerine (1:4) | [1] 21.09 |
| Sorbitol:glycerine (1:9) | [1] 18.00 |
| Sorbitol:glycerine (1:24) | [1] 15.15 |

[1] Precipitate readily apparent within twenty-four hours.

As noted, in preparing a stable stannous fluoride solution, preferably equal volumes of oxygen-free redistilled water and stabilizing agent are employed. Thus, the operative stabilizing agents of the present invention, when mixed with the preferred volume of water, yield compositions having the following volumetric ratios: sorbitol: water (1:1); and sorbitol:glycerine:water (1:3:4); (1:1:2); and (3:1:4). Although other stabilizing agent: water ratios may be successfully employed, the given 1:1 ratio between agent and water exhibits optimal effectiveness in producing a stable stannous fluoride solution.

As previously noted, the uptake of stannous and fluoride ions by the tooth tissue is directly related to the caries resistance of such tissue. Studies have been conducted in order to evaluate the relative effectiveness with respect to fluoride and stannous ion uptake of the stable stannous fluoride compositions of the present invention relative to aqueous stannous fluoride solutions.

Example V

A number of types of tooth tissue were treated with a stable stannous fluoride solution prepared in accordance with Example I and similar tissue was treated with an aqueous (but unstabilized) 30% stannous fluoride solution. The uptake of stannous and fluoride ion for each was determined by conventional procedures. The tissue types treated were sound enamel, decalcified enamel, freshly cut enamel, sound dentin, decalcified dentin, and freshly cut dentin. The data of Table IV (which contains stannous and fluoride ion uptake in microgram units) verify that, in each instance, greater fluoride and stannous ion uptake was experienced with the stable stannous fluoride solution of the present invention than was experienced with the aqueous (but unstabilized) stannous fluoride solution.

TABLE IV.—STANNOUS AND FLUORIDE ION UPTAKE

| | Treatment solution | | | |
|---|---|---|---|---|
| | Stable 30% $SnF_2$ | | Aqueous 30% $SnF_2$ | |
| Type of tooth substance treated | $Sn^{++}$ uptake (μg.) | $F^-$ uptake (μg.) | $Sn^{++}$ uptake (μg.) | $F^-$ uptake (μg.) |
| Sound enamel | 182.5 | 67.7 | 141.3 | 58.2 |
| Decalcified enamel | 618.8 | 229.9 | 267.5 | 121.2 |
| Freshly cut enamel | 312.6 | 72.3 | 157.6 | 42.6 |
| Sound dentin | 1,179.9 | 80.1 | 978.9 | 63.3 |
| Decalcified dentin | 231.3 | 38.7 | 200.1 | 33.3 |
| Freshly cut dentin | 1,135.2 | 129.7 | 953.1 | 129.4 |

The data of Table IV fully substantiate the effectiveness of the stable stannous fluoride solution of the present invention in promoting the caries resistance of treated tooth tissue.

Further studies hae been undertaken to determine the relative uptake in terms of the depth of penetration of stannous and fluoride ion from the stable stannous fluoride solutions of the present invention in contrast to aqueous (but unstabilized) stannous fluoride solutions of a similar concentration.

Example VI

The stannous and fluoride ion concentrations (in micrograms) at various levels of penetration (0–100 microns, 100–200 microns, and 200–300 microns from the surface) were measured for the preferred stable stannous fluoride composition of the present invention (i.e., the composition employing a 1:1 glycerine:sorbitol mixture as the stabilizing agent) and similar measurements were made for an aqueous (but unstabilized) 30% stannous fluoride solution. The concentration data for the stannous fluoride ions are shown in Table V.

TABLE V.—STANNOUS AND FLUORIDE ION UPTAKE STUDIES RELATIVE TO THE DEPTH OF PENETRATION OF STANNOUS AND FLUORIDE IONS IN SOUND ENAMEL

| Treatment solution | Depth of penetration ($\mu$ from surface) | | | | | |
|---|---|---|---|---|---|---|
| | 0–100$\mu$ | | 100–200$\mu$ | | 200–300$\mu$ | |
| | $Sn^{++}$ conc. ($\mu$g.) | $F^-$ conc. ($\mu$g.) | $Sn^{++}$ conc. ($\mu$g.) | $F^-$ conc. ($\mu$g.) | $Sn^{++}$ conc. ($\mu$g.) | $F^-$ conc. ($\mu$g.) |
| Stable 30% $SnF_2$ | 182.5 | 67.7 | 136.0 | 46.6 | 68.1 | 25.0 |
| Aqueous 30% $SnF_2$ | 141.3 | 58.2 | 34.4 | 38.4 | 19.4 | 21.4 |

As shown in Table V, in each instance, higher concentrations of both stannous and fluoride ions at each given level were obtained with the stable stannous fluoride solution of the present invention than were obtained with an aqueous (but unstabilized) 30% stannous fluoride solution. The data of Table V further substantiate the effectiveness of the compositions of the present invention in increasing the caries resistance of tooth structure.

In addition to permitting a higher level of fluoride and stannous ion uptake by tooth tissue, fewer problems of tissue reaction and tissue damage are experienced when the stable stannous fluoride compositions of the present invention are employed. Thus, the use of the stabilizing mixtures of the present invention permits greater freedom or latitude of use of stannous fluoride as a cavity treatment agent with the attendant benefits of reduction in caries susceptibility of the tooth tissue structure.

As previously noted, the stable stannous fluoride solutions of the present invention may be employed in treating a freshly cut tooth cavity prior to the introduction and filling thereof with restorative materials. A typical instance of such use of the stable stannous fluoride solution of the present invention is shown in the following example.

Example VII

Immediately following the removal from a tooth of carious tooth structure and debris and following the preparation of the walls of the cavity to provide means for retention of the restoration and prior to the placing of the restoration into the cavity, the stable stannous fluoride solution is applied to the cavity walls and allowed to dry. Where other cavity liners and/or sealers (e.g., varnishes and the like) or cements are employed, a stable stannous fluoride solution is applied and allowed to dry prior to the application of such liner or cement. The stable stannous fluoride treatment solution may conveniently be applied to the walls of the cavity by dipping a cotton pledget into the solution and painting the walls of the cavity therewith. The cavity walls are kept moist with the solution for 15 seconds. Following the treatment application, any excess solution is removed by drying with warm air. Thereafter, the normal restorative procedures may be resumed and the restoration completed.

When used in the foregoing manner, the stable stannous fluoride composition of the present invention provides a new and unique method for increasing the caries resistance of the tooth tissue.

While the stable stannous fluoride compositions of the present invention have been particularly described with reference to their use in the treatment of freshly cut tooth cavities, it will be obvious to those skilled in the art that the concepts of the present invention could also include the use of such compositions for other purposes in which a relatively highly concentrated yet stable aqueous stannous fluoride solution might be desired.

Moreover, while the subject invention has been described with reference to certain exemplary embodiments thereof, it should be understood that various changes, modifications, and alterations may be effected in the materials utilized, in the proportions of materials, and in the manners of formulation, without departing from the spirit and the scope of the subject invention, as defined in the appended claims.

What is claimed is:

1. A method for stabilizing an aqueous stannous fluoride solution comprising about 10–30% stannous fluoride by weight of the stabilized solution, which method comprises mixing therewith a stabilizing agent selected from the group consisting of sorbitol and mixtures of sorbitol and glycerine comprising at least about 25% sorbitol, by volume, the volumetric ratio of stabilizing agent to water being about 1:1.

2. A method, as claimed in claim 1, wherein the stabilizing agent is a 1:1 volume mixture of sorbitol and glycerine.

3. A method, as claimed in claim 1, wherein the stabilizing agent is sorbitol.

4. A method, as claimed in claim 1, wherein the stannous fluoride is present in the aqueous solution at a level of about 30% by weight of the stabilized solution.

References Cited

UNITED STATES PATENTS

| 2,876,168 | 3/1959 | Broge et al. | 167—93 |
| 2,946,725 | 7/1960 | Norris et al. | 167—93 |
| 3,105,798 | 10/1963 | Holliday et al. | 167—93 |
| 3,282,792 | 11/1966 | Fiscella | 167—93 |

FOREIGN PATENTS

| 845,611 | 8/1960 | Great Britain. |

OTHER REFERENCES

Accepted Dental Remedies: 32nd Edition, published by The American Dental Association, 1967, Chicago, p. 167. Copy in Group 124.

Journal of the American Dental Association: vol. 38, pp. 762–763, June 1949. Copy in POSL.

RICHARD L. HUFF, *Primary Examiner.*